Figure 1:
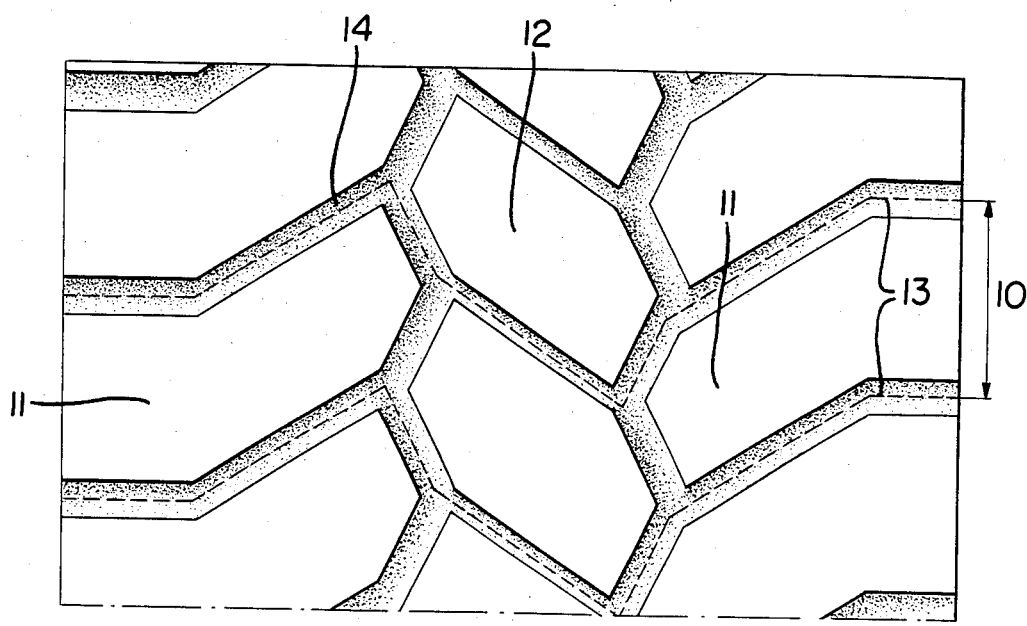

United States Patent [19]

Campos et al.

[11] Patent Number: 4,598,748
[45] Date of Patent: Jul. 8, 1986

[54] REDUCTION OF THE TRAVEL NOISE OF TIRES

[75] Inventors: Francis Campos, Clermont-Ferrand; Yves Herbelleau, Riom, both of France

[73] Assignee: Compagnie Generale des Etablissements Michelin, Clermont-Ferrand, France

[21] Appl. No.: 582,838

[22] Filed: Feb. 23, 1984

[30] Foreign Application Priority Data

Mar. 3, 1983 [FR] France .............................. 83 03662

[51] Int. Cl.$^4$ .............................................. B60C 11/11
[52] U.S. Cl. ................................................ 152/209 R
[58] Field of Search ............ 152/209 R, 209 D, 209 B

[56] References Cited

U.S. PATENT DOCUMENTS

| | | | |
|---|---|---|---|
| 2,006,197 | 6/1935 | Ewart et al. | 152/209 R |
| 2,878,852 | 3/1959 | Lippmann et al. | 152/209 R |
| 3,926,238 | 12/1975 | Vorih | 152/209 R |
| 4,442,499 | 4/1984 | Sekula | 152/209 R |
| 4,474,223 | 10/1984 | Landers | 152/209 R |

OTHER PUBLICATIONS

On Tire Noise (1)–"Current State of Tire Noise" by Tsuneo Miki et al, Jidosha Gijutsu, vol. 28, No. 1, 1974 pp. 61–66.
On Tire Noise (2)–"Mechanism of Generation and Preventive Measures" by Tsuneo Miki et al, Jidosha Gijutsu, vol. 28, No. 2, 1974, pp. 161–166.
On Tire Noise (3)–"Generation Mechanisms of Indirect Noise and Preventive Measures" by Tsuneo Miki et al, Jidosha Gijutsu, vol. 28, No. 3, 1974, pp. 234–241.

*Primary Examiner*—Michael Ball
*Attorney, Agent, or Firm*—Brumbaugh Graves Donohue & Raymond

[57] ABSTRACT

A tire which emits reduced travel noise, when moving on a surface, having a tread formed of load-bearing elements distributed over the circumference of the tire in accordance with a plurality of repetitive design cycles of variable pitch is characterized by the fact that the number of each of the principal design cycles of different pitch satisfies all of the n−1 general relationships (B):

$$\frac{1}{(\lambda_i)^{1.5}} \leq \frac{N_i}{N_n} \leq \frac{1}{(\lambda_i)^3}$$

and by the fact that the number of each of the design cycles present on the tread satisfies the relationship (C):

$$\sum_{i=1}^{i=n} N_i a_i + \sum_{j=1}^{j=m} N^*_j a^*_j = 2\pi R \pm \epsilon$$

it being understood that $$\sum_{j=1}^{j=m} N^*_j a^*_j$$

and/or $\epsilon$ may each be equal to zero.

17 Claims, 5 Drawing Figures

REDUCTION OF THE TRAVEL NOISE OF TIRES

The present invention relates to tires having a suitable tread design which makes it possible to reduce the noise emitted when the tires travel on a surface, and to a method of producing the design of the tread of these tires.

It is well known that when a tire travels on a surface, the load-bearing elements which form the tread give rise to various movements resulting in an audible sound which is generally converted into a travel noise which is unpleasant for the driver of the vehicle. It is also known that in order to improve the road-holding performance of a tire on wet ground and in order to avoid hydroplaning, it is desirable that the tread have numerous grooves of a substantially transverse or radial general orientation. However, this solution, which assures excellent evacuation of the water beneath the tread, greatly increases the travel noise emitted by the tire under way.

Numerous efforts have been made to reduce the travel noise emitted by a tire moving on a surface. Thus, in the tire industry ample use has been made for a long time of the technique which consists in modulating the travel noise produced by the rotating tire by varying the length of the design cycle of the tread of a tire over its circumference. This technique is known under the name of "variable pitch."This technique is also used by arranging the design cycles of variable pitch either along a random or sinusoidal distribution on the circumference of the tire or in accordance with algebraic or trigonometric relationships which have been preselected in order to reduce the amplitude of certain critical frequencies emitted by the tire when travelling and to spread them over a wider frequency band. These techniques are described, for example, in SAE Publication No. 690,520 under the title "Quieting Noise Mathematically—Its Application to Snow Tires," as well as in French Patent No. 2,416,803 and in U.S. Pat. Nos. 2,006,197, 3,926,238 and 3,989,780.

The object of the present invention is to reduce the travel noise emitted by a tire when it is travelling on a surface by the use of a method which makes it optimally possible to distribute the acoustic energy produced by the rotating tire as uniformly as possible over a wide frequency band, each frequency being of lowest energy.

For conditions of practical manufacture of the molds it is desirable to use a whole number of design cycles on the circumference of the tread of a tire. By "design cycle" there is meant any portion of the tread which comprises, in the circumferential direction, a load-bearing element and a groove of transverse general orientation adjacent to the load-bearing element. However, it is not indispensable that the circumferential limits of this portion of tread pass along the circumferential edges of the two adjacent load-bearing elements. Provided that the portion extends over a distance equivalent to the sum of the distances, measured in the circumferential direction, of a load-bearing element and a groove of transverse general orientation, the delimitation of the design cycle may pass at any point of two adjacent load-bearing elements. By "groove of transverse general orientation" there is understood any groove which forms an average angle of 25° to 90° with reference to the circumferential direction of the tire. If one takes a tire tread formed of a total number N of repetitive design cycles distributed in a number m of design cycles of different lengths $a$ classified by order of increasing size $a_1 < a_2 \ldots < a_i \ldots < a_p$, the respective numbers of which are $N_1, N_2, N_i, N_p$, it is considered within the scope of the application in accordance with the invention that these design cycles may be distributed in two categories, namely the principal design cycles, on the one hand, and the looping design cycles, on the other hand. The looping design cycles are those whose total number $N^*_i$ of design cycles $a_i$ of the same size satisfies the twofold relationship (A):

$$N^*_i \leq 3 \text{ and}$$

$$N^*_i \leq \frac{2N \cdot \lambda_1^2}{n(\lambda_1^2 + \lambda_1 + 1)}$$

in which:

N represents the total number of design cycles present on the circumference of the tire, n is a whole number which indicates the number of principal design cycles of different pitch, that is to say the number of repetitive design cycles of different pitch the total number $N_i$ of which for each of the design cycles of rank i in question is greater than 3, and it also designates the principal design cycle having the maximum pitch, $\lambda_1$ represents the pitch ratio between the pitch of the smallest design cycle and the pitch of the largest design cycle, the total number of which, $N_i$ and $N_n$, is greater than 3 for each.

The principal design cycles are all the other repetitive design cycles which do not satisfy the twofold relationship (A). These n principal design cycles are classified by order of increasing size as follows:

$$a_1 < a_2 < \ldots a_i < a_n, N_1, N_2, \ldots N_i \ldots N_n$$

being the respective numbers of principal design cycles of the same pitch. The looping design cycles are also classified by order of increasing size as follows:

$$a^*_1 < a^*_2 < \ldots < a^*_j \ldots < a^*_m, N^*_1, N^*_2, \ldots N^*_j, N^*_m$$

being the respective numbers of looping design cycles of the same pitch and m indicating the number of looping design cycles of different pitch.

The object of the invention is a tire whose tread is formed of load-bearing elements distributed over the circumference of the tire in accordance with a plurality of repetitive design cycles of variable pitch, characterized by the fact that the number of each of the principal design cycles of different pitch satisfies all of the $n-1$ general relationships (B):

$$\frac{1}{(\lambda_i)^{1.5}} \leq \frac{N_i}{N_n} \leq \frac{1}{(\lambda_i)^3}$$

and by the fact that the number of each of the design cycles present on the tread satisfies the relationship (C):

$$\sum_{i=1}^{i=n} N_i a_i + \sum_{j=1}^{j=m} N^*_j a^*_j = 2\pi R \pm \epsilon$$

it being understood that $$\sum_{j=1}^{j=m} N^*_j a^*_j$$

and/or $\epsilon$ can each be equal to zero, n represents the number of principal design cycles of different pitch present on the tread of the tire, which is a whole number at least equal to 3, preferably from 4 to 7, and it also designates the principal design cycle having the maximum pitch, m represents the number of looping design cycles of different pitch present on the tread of the tire, which may be either zero or a whole number, and it also designates the looping design cycle having the maximum pitch, i represents any one, the $i^{th}$, of the principal design cycles of rank i other than the one of maximum pitch, j represents any one, the $j^{th}$, of the looping design cycles of rank j, $\lambda_i$ represents the pitch ratio of the length of each of the principal design cycles of rank i in question to the length of the principal design cycle of maximum pitch, R represents the radius of the tire measured at the periphery of the tread which comes into contact with the surface of the ground, $\epsilon$ represents the tolerance in occurrence of the design cycles on the circumference of the tire, $a_i$ represents the length of the principal design cycle of rank i in question of the principal design cycles of different pitch, $a^*_j$ represents the length of the looping design cycle of rank j in question of the looping design cycles of different pitch, $N_n$ represents the total number of principal design cycles of maximum pitch, $N_i$ represents for each of the principal design cycles of rank i having a pitch less than the pitch of the principal design cycle of maximum pitch, the total number of principal design cycles of rank i, and $N^*_j$ represents the total number of looping design cycles of each of the cycles of rank j in question.

In accordance with a variant embodiment, one remains within the scope of the invention when the number of principal design cycles n being equal to or greater than 5, the number of each of the principal design cycles of different pitch satisfies only $n-2$ relations of equation (B) from among the $n-1$ relations or else when there are no looping design cycles present.

Another object of the invention is a method which makes it possible to distribute as uniformly as possible the travel noise emitted by a tire when it travels on a surface over a wide frequency band, each frequency being of lowest energy.

In the prior art it was believed that the acoustic signal emitted by each design cycle is independent of the length, that is to say of the pitch of the design cycle, and can be assimilated to a unit pulse, the differences in pitch entering into play only with respect to the relative possibilities of stagger of the design cycles with respect to each other.

The work of the applicants has shown that, contrary to what had been previously believed, the acoustic signal, deduced from measurements, which is given off by a design cycle is very complicated and includes numerous harmonics whose amplitude varies with the length of the design cycle. In other words, the applicants have discovered that, in order to optimally distribute the travel noise emitted by a tire moving on a surface over a wide frequency band, each frequency being of lowest energy and being distributed as uniformly as possible over the frequency band, it is indispensable to use a number of design cycles of rank i of different pitch, the smaller the pitch ratio $\lambda_i$ of the pitch of the principal design cycle of rank i to the pitch of the principal design cycle of maximum pitch, the higher the aforementioned number, by giving preference to the number of principal design cycles of small pitch over the number of principal design cycles of large pitch.

Thus if one has a tread having only principal design cycles and if one has n repetitive principal design cycles, it results therefrom that if the lengths $a_i$ are such that $a_1 < a_2 < \ldots < a_n$, then one has $\lambda_1 < \lambda_2 < \ldots < \lambda_n$. In this case, the lengths $a_i$ of each repetitive principal design cycle of rank i are selected in accordance with the relationship (D):

$$\frac{1}{1 - \frac{1 - \lambda_1}{n - 1}(i - 1.1)} \leq \frac{a_i}{a_1} \leq \frac{1}{1 - \frac{1 - \lambda_1}{n - 1}(i - 0.9)}$$

in which i is a whole number between 2 and $n-1$, so that the basic frequencies of each of the n principal design cycles are distributed regularly over the band of frequencies between the frequencies emitted which correspond to the smallest principal design cycle and to the largest principal design cycle.

The method of the invention comprises the following steps:

The length $a_1$ or pitch of the smallest principal design cycle $A_1$ which can be used is fixed, based on the unit design adopted for the load-bearing elements constituting the tread, taking into account the fact that it is not possible to go below certain limits, which are known to the man skilled in the art;

the length $a_n$ of the largest principal design cycle $A_n$ which can be used is fixed on basis of the unit design adopted for the load-bearing elements;

from this there is deduced the maximum pitch ratio $\lambda_1 = a_1/a_n$; this pitch ratio is generally from 0.5 to 1 and even from 0.5 to 0.8. According to the invention, there is preferably employed a pitch ratio $\lambda_1$ of from 0.60 to 0.75;

the number n of principal design cycles of different pitch is fixed as a function of the pitch ratio $\lambda_1$ previously determined. In accordance with one preferred embodiment of the invention, one uses n=4 design cycles when $0.70 < \lambda_1 \leq 0.75$
n=5 design cycles when $0.65 < \lambda_1 < 0.70$
n=6 design cycles when $0.60 < \lambda 1 < 0.65$;

the pitch of each of the principal design cycles of rank i other than those of maximum and minimum pitch already established is fixed in such a manner that $$\frac{1}{1 - \frac{1 - \lambda_1}{n - 1}(i - 1.1)} \leq \frac{a_i}{a_1} \leq \frac{1}{1 - \frac{1 - \lambda_1}{n - 1}(i - 0.9)}$$

and preferably $$a_i = \frac{a_1}{1 - \frac{i-1}{n-1}(1-\lambda_1)}$$

the number n of the principal design cycles which are all to have a different pitch and their respective pitches being determined, one fixes the total number of principal design cycles $N_i$ of each of the principal design cycles of rank i in such a manner that it satisfies the equations:

$$N_1 \cdot (\lambda_1)^\beta = N_2 \cdot (\lambda_2)^\beta = N_3 \cdot (\lambda_3)^\beta = \ldots = N_n \text{ and} \quad (C)$$

$$N_1 \cdot a_1 + N_2 \cdot a_2 + N_3 \cdot a_3 + \ldots + N_n \cdot a_n = 2\pi R \pm \epsilon \quad (D)$$

in which N, $\lambda$, R and $\epsilon$ have the meanings indicated above;

$\beta$ is an exponent which is a function of the manner in which the acoustic signal varies from one principal design cycle to another when passing from the smallest principal design cycle to the largest principal design cycle and which is between 1.5 and 3, and $a_i$ represents the respective lengths or pitches of the principal design cycles of rank i in question, and $a_n$ is the length of the principal design cycle of maximum pitch.

From these n equations one obtains:

$$N_n = \frac{2\pi R \pm \epsilon}{a_n \sum_{i=1}^{i=n} \frac{1}{(\lambda_i)^\beta - 1}} \text{ and } \frac{N_i}{N_n} = \frac{1}{(\lambda_i)^\beta}$$

Fractional numbers are obtained and it is then advisable to take the closest whole solution of these fractional numbers in view of the fact that the tire is circumferential and that a whole number of repetitive design cycles is needed; the man skilled in the art may also use the method described by adding a minority of looping design cycles in order to effect the looping on the circumference of the tread of the tire by a whole number of design cycles;

a computer is then used which has a program adapted to select the distribution of all of the principal design cycles or of all of the principal and looping design cycles on the circumference of the tread of the tire which will give the optimal spread of the acoustic signal over a wide band of frequencies of lowest energy. The program disclosed in the aforementioned S.A.E. Publication No. 690,520 may be used for this purpose.

It is understood that the invention applies also to cases in which the principal design cycle extends over the entire width of the tread or over only a part of the width thereof, in particular half thereof. The invention also applies to tire treads whose load-bearing elements have very complicated shapes which may differ at the edges and the center of the tread and/or the design cycles of which are staggered to a greater or lesser extent with respect to each other in the circumferential direction.

The invention is illustrated by means of Examples 1 to 3 and FIGS. 1 to 5.

FIG. 1 shows a portion of the tread of a tire in accordance with the present invention which has a succession of principal design cycles 10, partially staggered from one edge to the other of the tread, comprising one load-bearing element 11 or two load-bearing elements 11 and 12 which extend between the center lines 13 of the adjacent grooves of transverse general orientation 14 separating two load-bearing elements.

Figure 2:
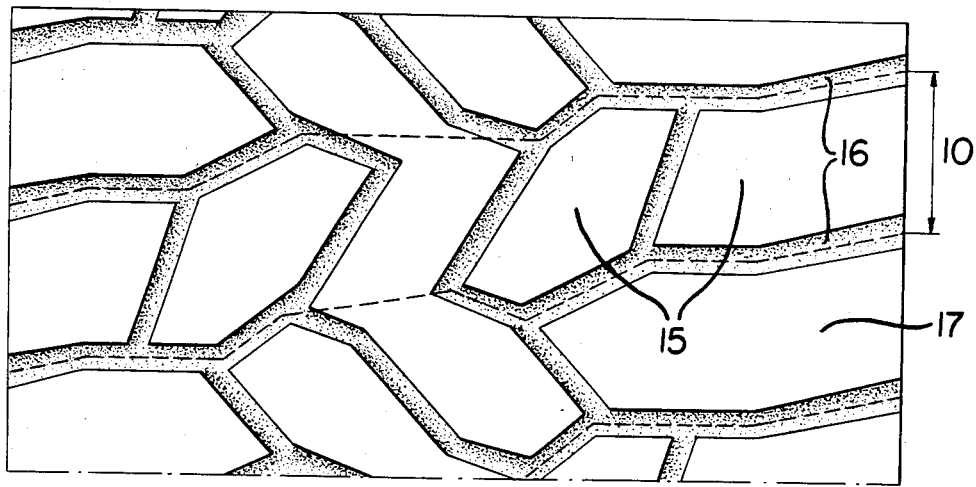

FIG. 2 shows a portion of another tread of a tire according to the present invention which has a succession of principal design cycles 10 having load-bearing elements 15 or 17 separated by grooves of transverse general orientation 16. The design cycles may be slightly different as in FIG. 2; they will be considered identical for the determination of $N_i$ if they have the same width.

Figure 3:
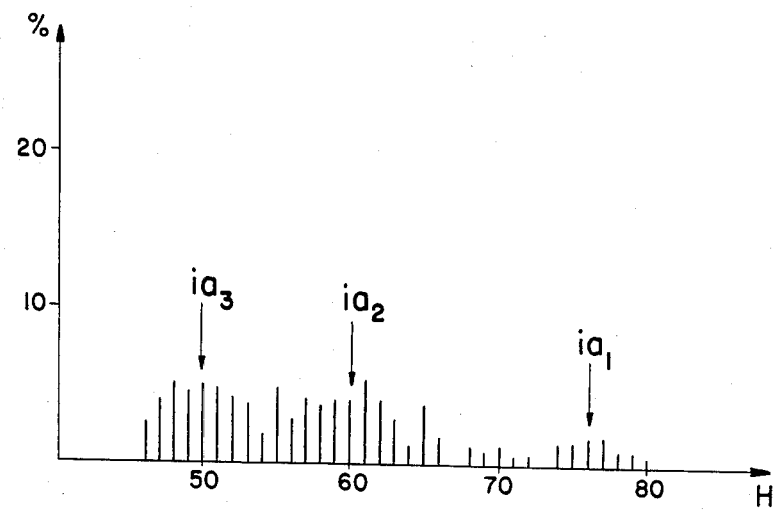
Figure 4:
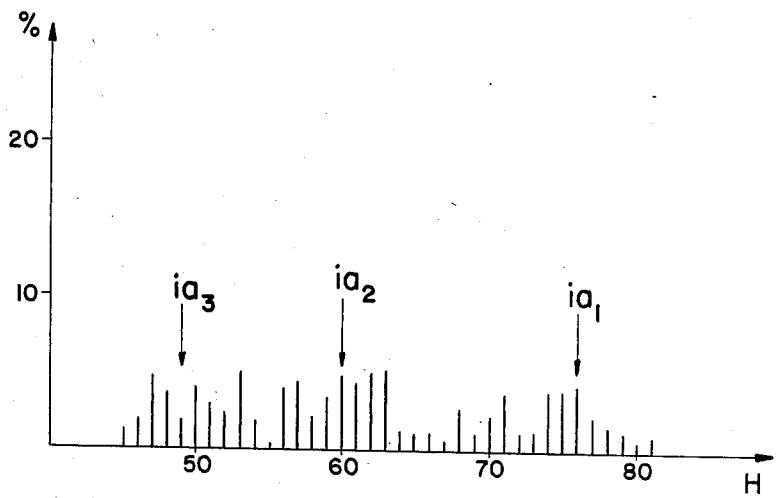
Figure 5:
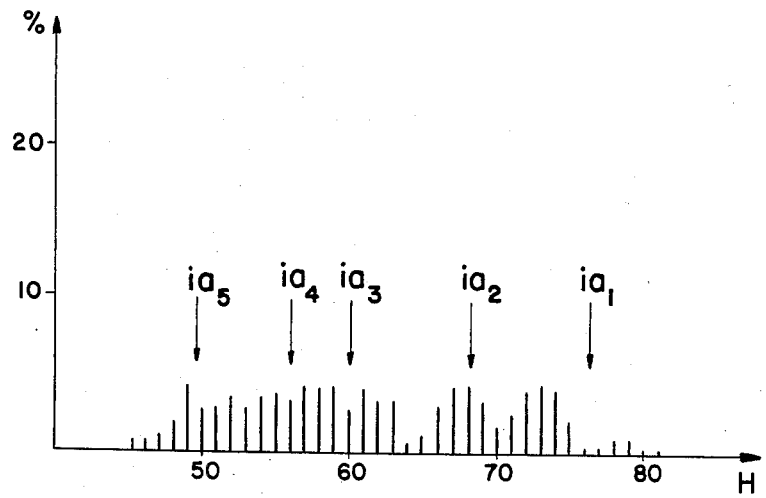

FIG. 3 shows a frequency diagram corresponding to a tire having a variation in pitch in accordance with the prior art, while FIGS. 4 and 5 correspond to tires developed in accordance with the invention. In FIGS. 3, 4 and 5 the harmonics per revolution of wheel is shown on the abscissa while the relative amplitude in percent is shown on the ordinate. In all the examples, there is used a radial tire of size 145 SR 13 having a developed length of 177.24 cm, the shape of the load-bearing elements of which is identical.

EXAMPLE 1

This example illustrates the case of a radial tire whose load-bearing elements present on the circumferential tread of the tire are distributed in accordance with three principal design cycles $A_1$, $A_2$, $A_3$ of different pitch such that the pitch $a_2$ of the cycle $A_2$ is equal to $a_2 = (a_1 + a_3)/2$, in which $a_1$ and $a_3$ represent the respective pitches of the smallest design cycle $A_1$ and the largest design cycle $A_3$. Furthermore, the total number of principal design cycles of rank 1, 2 and 3 is equal to $N_{A1} = N_{A2} = N_{A3} = 20$ and the pitch ratio $\lambda$ is equal to 0.65. The succession of principal design cycles is as follows:

$A_1A_2A_3A_1A_1A_1A_1A_1A_1A_1A_1A_1A_1A_1A_3A_2A_1A_2A_1$ $A_1A_1A_3A_2A_2A_2A_2A_2A_3A_2A_2A_2A_2A_2A_1A_2A_2A_2A_2A_2$ $A_3A_3A_3A_3A_1A_2A_3A_3A_3A_3A_3A_3A_3A_3A_3A_3A_3A_2A_1A_3.$

The pitches of the three principal design cycles are 23.27 mm, 29.54 mm and 35.81 mm, respectively.

FIG. 3 shows that the energy is distributed rather well between the characteristic lines $i_{a3}$ and $i_{a2}$ but that there is little energy around the line $i_{a1}$.

The spread qualities of a spectrum can be indicated diagrammatically by calculating, for the lines contained between the extreme characteristic lines which correspond to the principal design cycles of rank 1 and n, the ratio $\sigma/\overline{m}$ in which $\overline{m}$ and $\sigma$ are the mean energy and the standard deviation, respectively.

It is noted from FIG. 3 that $\sigma/\overline{m} = 0.69$ and that the amplitude of the maximum characteristic line reaches 5.3% of the total energy of the spectrum.

EXAMPLE 2

This example illustrates the case of a radial tire whose load-bearing elements present on the circumferential tread are distributed, in accordance with the invention, along three principal design cycles $A_1$, $A_2$, $A_3$ of different pitch such that $a_1 < a_2 < a_3$ and that the pitch of the cycle $A_2$ is equal to $a_2 = (a_1 + a_3)/2$, the pitch ratio $\lambda$ being equal to 0.65 and the total number of each design cycle of rank 1, 2 and 3 satisfying the equation:

$$N_{A1} \cdot \lambda^2{}_{A1} = N_{A2} \cdot \lambda^2{}_{A2} = N_c,$$

that is to say $$N_{A1}=32, N_{A2}=19 \text{ and } N_{A3}=13.$$

The succession of principal design cycles is as follows:

$A_1A_1A_1A_1A_1A_1A_1A_1A_1A_1A_1A_1A_1A_1A_1A_1A_1A_1$ $A_1A_2A_1A_1A_2A_1A_1A_1A_1A_3A_1A_1A_1A_2A_2A_2A_2A_2A_2$ $A_1A_2A_2A_2A_2A_2A_1A_3A_2A_2A_2A_2A_2A_3A_3A_2A_1A_3A_3A_3$ $A_3A_3A_3A_3A_3A_3.$

The pitches of the three principal design cycles are identical to those of Example 1.

FIG. 4 shows that, in accordance with this embodiment of the invention, one has a better spread of the energy, that is to say a reinforcement of the energy around the line $i_{a1}$. However, there can still be noted a lack of energy between the lines $i_{a2}$ and $i_{a1}$. It is noted that $(\sigma/\overline{m})32\ 0.60$ and that the amplitude of the maximum characteristic line reaches 5.2% of the total energy of the spectrum.

EXAMPLE 3

This example illustrates the case of a radial tire whose load-bearing elements present on the tread are distributed, in accordance with the invention, in a preferred variant in which five principal design cycles $A_1$, $A_2$, $A_3$, $A_4$, $A_5$ of different pitch are used such that the pitch ratio $\lambda$ is equal to 0.65 and the total number of each principal design cycle satisfies the equation:

$$\lambda^2{}_{A1} \cdot N_{A1} = \lambda^2{}_{A2} \cdot N_{A2} = \lambda^2{}_{A3} \cdot N_{A3} = \lambda^2{}_{A4} \cdot N_{A4} = N_{A5},$$

that is to say $N_{A1}=20$, $N_{A2}=16$, $N_{A3}=12$, $N_{A4}=9$ and $N_{A5}=7$.

The succession of principal design cycles is as follows:

$A_1A_1A_1A_1A_1A_1A_1A_1A_3A_1A_1A_2A_2A_1A_1A_1A_1A_1A_1A_1$ $A_1A_2A_2A_2A_2A_2A_2A_2A_2A_1A_2A_2A_2A_2A_2A_2A_3A_3A_3$ $A_3A_3A_1A_3A_3A_3A_3A_3A_3A_4A_4A_4A_4A_4A_4A_4A_4A_5$ $A_5A_5A_5A_5A_5A_5.$

The pitches of the five principal design cycles are 23.27 mm, 26.145 mm, 29.83 mm, 31.55 mm and 35.81 mm.

FIG. 5 shows that, in accordance with this preferred embodiment, one has a better spread of energy between the characteristic lines $i_{a5}$ and $i_{a1}$. It is noted that $(\sigma/\overline{m})=0.46$ and that the amplitude of the maximum characteristic line is 4.8% of the total energy of the spectrum. It therefore clearly follows that, as compared with the prior art, the method of the invention makes it possible to change from $(\sigma/\overline{m})=0.69$ to $(\sigma/\overline{m})=0.46$, that is to say to obtain an appreciable gain in the spread of the acoustic energy produced by the tire.

What is claimed is:

1. A tire whose tread is formed of load-bearing elements distributed over the circumference of the tire in accordance with a plurality of repetitive design cycles of variable pitch, characterized by the fact that the number of each of the principal design cycles of different pitch satisfies all of the $n-1$ general relationships (B):

$$\frac{1}{(\lambda_i)1.5} \leq \frac{N_i}{N_n} \leq \frac{1}{(\lambda_i)3}$$

and by the fact that the number of each of the design cycles present on the tread satisfies the relationship (C):

$$\sum_{i=1}^{i=n} N_i a_i + \sum_{j=1}^{j=m} N^*_j a^*_j = 2\pi R \pm \epsilon$$

it being understood that $$\sum_{j=1}^{j=m} N^*_j a^*_j$$

and/or $\epsilon$ may each be equal to zero, n represents the number of principal design cycles of different pitch present on the tread of the tire, which is a whole number at least equal to 3, preferably from 4 to 7, and it also designates the principal design cycle having the maximum pitch, m represents the number of looping design cycles of different pitch present on the tread of the tire, which may be either zero or a whole number, and it also designates the looping design cycle having the maximum pitch, i represents any one, the $i^{th}$, of the principal design cycles of rank i other than that of maximum pitch, j represents any one, the $j^{th}$, of the looping design cycles of rank j, $\lambda_i$ represents the pitch ratio of the length of each of the principal design cycles of rank i in question to the length of the principal design cycle of maximum pitch, R represents the radius of the tire measured at the periphery of the tread which comes into contact with the surface of the ground, $\epsilon$ represents the tolerance in the production of the design cycles on the circumference of the tire, $a_i$ represents the length of the principal design cycle of rank i in question of the principal design cycles of different pitch, $a^*_j$ represents the length of the looping design cycle of rank j in question of the looping design cycles of different pitch, $N_n$ represents the total number of principal design cycles of maximum pitch, $N_i$ represents, for each of the principal design cycles of rank i having a pitch less than the pitch of the principal design cycle of maximum pitch, the total number of principal design cycles of rank i, and $N^*_j$ represents the total number of looping design cycles of each of the cycles of rank j in question.

2. A tire according to claim 1, characterized by the fact that n is equal to 5.

3. A tire according to claim 1, characterized by the fact that n is equal to 6.

4. A tire according to claim 1, characterized by the fact that $\lambda_i$ is from 0.5 to 0.8.

5. A tire whose tread is formed of load-bearing elements distributed over the circumference of the tire in accordance with a plurality of repetitive design cycles of variable pitch, characterized by the fact that the number of each of the principal design cycles of different pitch satisfies the n−2 relationships of the n−1 general relationships (B):

$$\frac{1}{(\lambda_i)^{1.5}} \leq \frac{N_i}{N_n} \leq \frac{1}{(\lambda_i)^3}$$

and by the fact that the number of each of the design cycles present on the tread satisfies the relationship (C):

$$\sum_{i=1}^{i=n} N_i a_i + \sum_{j=1}^{j=m} N^*_j a^*_j = 2\pi R \pm \epsilon$$

it being understood that $$\sum_{j=1}^{j=m} N^*_j a^*_j$$

and/or $\epsilon$ may each be equal to zero, n represents the number of principal design cycles of different pitch present on the tread of the tire, which is a whole number at least equal to 5, and it also designates the principal design cycle having the maximum pitch, m represents the number of looping design cycles of different pitch present on the tread of the tire, which may be either zero or a whole number, and it also designates the looping design cycle having the maximum pitch, i represents any one, the $i^{th}$, of the principal design cycles of rank i other than that of maximum pitch, j represents any one, the $j^{th}$, of the looping design cycles of rank j, $\lambda_i$ represents the pitch ratio of the length of each of the principal design cycles of rank i in question to the length of the principal design cycle of maximum pitch, R represents the radius of the tire measured at the periphery of the tread which comes into contact with the surface of the ground, $\epsilon$ represents the tolerance in the production of the design cycles on the circumference of the tire, $a_i$ represents the length of the principal design cycle of rank i in question of the principal design cycles of different pitch, $a^*_j$ represents the length of the looping design cycle of rank j in question of the looping design cycles of different pitch, $N_n$ represents the total number of principal design cycles of maximum pitch, $N_i$ represents, for each of the principal design cycles of rank i having a pitch less than the pitch of the principal design cycle of maximum pitch, the total number of principal design cycles of rank i, and $N^*_j$ represents the total number of looping design cycles of each of the cycles of rank j in question.

6. A tire according to claim 1, characterized by the fact that
n=4 when $0.70 < \lambda_1 \leq 0.75$
n=5 when $0.65 < \lambda_1 < 0.70$
n=6 when $0.60 < \lambda_1 < 0.65$.

7. A tire according to claim 1, characterized by the fact that the pitch of each of the principal design cycles of rank i is such that:

$$\frac{1}{1 - \frac{1 - \lambda_1}{n - 1}(i - 1.1)} \leq \frac{a_i}{a_n} \leq \frac{1}{1 - \frac{1 - \lambda_1}{n - 1}(i - 0.9)}.$$

8. A tire according to claim 1, characterized by the fact that the pitch of each of the principal design cycles of rank i is such that:

$$a_i = \frac{a_1}{1 - \frac{i - 1}{n - 1}(1 - \lambda_1)}.$$

9. A tire according to claim 1, characterized by the fact that it has a radial carcass.

10. A method of producing the design of a tire tread formed of load-bearing elements distributed over the circumference of the tire in accordance with a plurality of repetitive design cycles of variable pitch, characterized by fixing the length $a_1$ of the smallest principal design cycle $i_1$ of the tread;

then fixing the length $a_n$ of the largest principal design cycle n;

determining the maximum pitch ratio $\lambda_1 = a_1/a_n$;

then fixing the number n of repetitive principal design cycles of different pitch as a function of the pitch ratio $\lambda_1$ previously determined;

then fixing the pitch of each of the repetitive principal design cycles of rank i other than those of the maximum and minimum pitches, respectively;

then fixing the total number of repetitive principal design cycles $N_i$ of each of the principal design cycles of rank i between i=1 and i=n by applying the equations:

$$N_1 \cdot (\lambda_1)^\beta = N_2 \cdot (\lambda_2)^\beta = \ldots = N_n \text{ and}$$

$$N_1 \cdot a_1 + N_2 \cdot a_2 + \ldots + N_n \cdot a_n = 2\pi R \pm \epsilon$$

in which the symbols N, $\lambda$, $\epsilon$, and a have the same meaning as in claim 1 for principal design cycles of rank i=1, 2, ... n and $\beta$ is an exponent which is a function of the manner in which the acoustic signal varies from one principal design cycle to another when one passes from the smallest principal design cycle to the largest principal design cycle and which is between 1.5 and 3 taking the whole numbers closest to the fractional numbers obtained;

then using a computer programmed to select the distribution of the total number of repetitive principal design cycles on the circumference of the tread which will give the optimal spread of the acoustic signal produced by the tire over a wide band frequency of lowest energy.

11. A method according to claim 10, characterized by the fact that n is equal to 4.

12. A method according to claim 10, characterized by the fact that n is equal to 5.

13. A method according to claim 10, characterized by the fact that n is equal to 6.

14. A method according to claim 10, characterized by the fact that the pitch of each of the principal design cycles of rank i is such that:

$$\frac{1}{1-\frac{1-\lambda_1}{n-1}(i-1.1)} \leqq \frac{a_i}{a_n} \leqq \frac{1}{1-\frac{1-\lambda_1}{n-1}(i-0.9)}.$$

15. A method according to claim 10, characterized by the fact that the pitch of each of the principal design cycles of rank i is such that:

$$a_i = \frac{a_1}{1-\frac{i-1}{n-1}(1-\lambda_1)}.$$

16. A method according to claim 10, characterized by the fact that $\lambda_i$ is from 0.5 to 0.8.

17. A method according to claim 10, characterized by the fact that
n=4 when $0.70<\lambda_1\leqq0.75$
n=5 when $0.65<\lambda_1<0.70$
n=6 when $0.60<\lambda_1<0.65$.

* * * * *

UNITED STATES PATENT AND TRADEMARK OFFICE
CERTIFICATE OF CORRECTION

PATENT NO. : 4,598,748
DATED : July 8, 1986
INVENTOR(S) : Francis Campos et al

It is certified that error appears in the above-identified patent and that said Letters Patent is hereby corrected as shown below:

Column 6, line 54, "σ/m̄in" should read -- σ/m̄ in --
and "m̄and" should read -- m̄ and --. Column 7,
line 25, "32" should read -- = --. Column 8, line
46, "εrepresents" should read -- ε represents --.
Column 10, line 41, that part of the equation
reading "62" should read -- β --.

Signed and Sealed this

Twentieth Day of January, 1987

*Attest:*

DONALD J. QUIGG

*Attesting Officer*   *Commissioner of Patents and Trademarks*